United States Patent [19]

Takei et al.

[11] Patent Number: 4,890,130

[45] Date of Patent: Dec. 26, 1989

[54] LENS-FITTED PHOTOGRAPHIC FILM PACKAGE

[75] Inventors: Hisashi Takei, Kanagawa; Hiroshi Ohmura, Tokyo; Seimei Ushiro, Tokyo; Mitsuyoshi Mochida, Tokyo; Yoshihiko Nakamura, Kanagawa; Seiji Asano, Saitama; Toshio Yoshida, Ibaragi, all of Japan

[73] Assignee: Fuji Photo Film Co., Ltd., Kanagawa, Japan

[21] Appl. No.: 111,156

[22] Filed: Oct. 19, 1987

[30] Foreign Application Priority Data

| Oct. 17, 1986 | [JP] | Japan | 61-246979 |
| Jan. 19, 1987 | [JP] | Japan | 62-5699[U] |
| Jan. 19, 1987 | [JP] | Japan | 62-5696[U] |
| Feb. 12, 1987 | [JP] | Japan | 62-30140 |
| Aug. 19, 1987 | [JP] | Japan | 62-126190[U] |

[51] Int. Cl.⁴ ............... G03B 17/02; G03B 17/00
[52] U.S. Cl. .................... 354/288; 354/203
[58] Field of Search ............ 354/202, 203, 275, 288; 354/173.1; 220/269, 270, 274

[56] References Cited

U.S. PATENT DOCUMENTS

| 3,138,084 | 6/1964 | Harvey | 354/213 |
| 3,585,913 | 6/1971 | Lange | 354/202 |
| 3,715,052 | 2/1973 | Kinkel et al. | 220/270 |
| 3,782,259 | 1/1974 | Noble | 354/202 X |
| 4,082,201 | 4/1978 | Bittel | 220/269 X |
| 4,176,701 | 12/1979 | Welgan | 354/64 X |
| 4,208,117 | 6/1980 | Harvey et al. | 354/275 |
| 4,247,600 | 1/1981 | Adachi | 354/288 X |
| 4,309,921 | 1/1982 | Miller | 220/274 X |
| 4,313,538 | 2/1982 | Bauer et al. | 206/455 |
| 4,460,103 | 7/1984 | Rama et al. | 220/269 X |
| 4,601,562 | 7/1986 | Yoneyama et al. | 354/288 X |
| 4,668,070 | 5/1987 | Wakabayashi et al. | 354/288 X |
| 4,742,366 | 5/1988 | Nakazawa | 354/288 X |

FOREIGN PATENT DOCUMENTS

| 949324 | 9/1956 | Fed. Rep. of Germany | 354/288 |
| 1975027 | 12/1967 | Fed. Rep. of Germany | |
| 1991324 | 8/1968 | Fed. Rep. of Germany | |
| 2009096 | 3/1973 | Fed. Rep. of Germany | |
| 7307005 | 5/1973 | Fed. Rep. of Germany | |
| 6708486 | 3/1968 | Netherlands | 354/288 |
| 558515 | 1/1944 | United Kingdom | |
| 558516 | 1/1944 | United Kingdom | |
| 607242 | 8/1948 | United Kingdom | |
| 638660 | 6/1950 | United Kingdom | |
| 1060937 | 3/1967 | United Kingdom | 354/288 |
| 1462353 | 1/1977 | United Kingdom | |
| 1478907 | 7/1977 | United Kingdom | |
| 2136975 | 9/1984 | United Kingdom | |

OTHER PUBLICATIONS

Leitz Catalogue, Jul., 1977, p. 90.

Primary Examiner—Donald A. Griffin
Attorney, Agent, or Firm—Young & Thompson

[57] ABSTRACT

A lens-fitted photographic film package includes a light-tight film case with a taking lens fitted thereto, an empty film container enclosed in the light-tight film case, and a rolled film with its one end retained in the empty film container enclosed in the light-tight film case. The light-tight film case is provided with a portion openable to form an opening in the light-tight film case through which the film container, e.g. a standard film patrone having a spool, is removed in an axial direction.

33 Claims, 9 Drawing Sheets

LENS-FITTED PHOTOGRAPHIC FILM PACKAGE

BACKGROUND OF THE INVENTION

The present invention relates to a lens-fitted photographic film package, and more particularly to a lens-fitted photographic film package in which a photographic film, a taking lens and an exposure device with their associated elements are incorporated in a light-tight film case as an integral whole.

A lens-fitted photographic film package now on the market provides many chances to enjoy oneself by conveniently taking pictures even with no camera. This lens-fitted photographic film package comprises, as an integral whole, a film case having a taking lens and a simple exposure mechanism which includes a film winding mechanism and a shutter mechanism with their associated elements incorporated in the film case, and a 110-size cartridge film or a film contained in a 35 mm-size film patrone previously packaged in the film case, which can be sold wherever photographic film is sold. This lens-fitted photographic film package can be sold at low cost because there need be no provision of a film loading back cover, a film rewinding mechanism, a complicated exposure control mechanism and so forth, and provides photographers with trouble-free amusement when taking pictures because there is no need to load and unload a film.

The lens-fitted photographic film package, after the exposure of all frames of the film, is forwarded to a photo shop or photo laboratory without removing the film. There, the exposed film in a film cartridge is removed by breaking open the film package and is then developed to make prints therefrom while the empty film package is scrapped. The prints together with the developed film are returned to the customer.

If the lens-fitted photographic film package is provided with a back cover for loading and unloading a film cartridge or a film patrone after exposure, it is impossible to make the lens-fitted photographic film package at a low cost. Furthermore, the provision of such a back cover would allow users to load another film cartridge or patrone in the used photographic film package and to reuse it. Because the lens-fitted photographic film package is generally intended not only to avoid any reuse thereof but also to be sold at a low cost, poor quality pictures will be possibly made if the lens-fitted photographic film package is reused. For avoiding such reuse, the lens-fitted photographic film package can be provided with a back cover that can be opened only by destroying the package. The provision of such an unopenable back cover forces photographers to destroy the lens-fitted photographic film package if the photographer attempts to take out the film himself. Therefore, the provision of an unopenable back cover can prevent the used lens-fitted photographic film package from being reused. However, if the unopenable back cover is unduly difficult to break open, the film in the lens-fitted photographic film package may be destroyed even in the photo shop or laboratory. Thus it is desirable that photo shops wherein a large number of lens-fitted photographic film packages are handled for processing be able readily to break the lens-fitted photographic film package to take out the film.

OBJECTS OF THE INVENTION

It is, therefore, an object of the present invention to provide a lens-fitted photographic film package which makes it possible to remove easily an exposed film therefrom.

It is another object of the present invention to provide a lens-fitted photographic film package so constructed as to be limited to a single use.

SUMMARY OF THE INVENTION

To accomplish the above and other objects, the lens-fitted photographic film package according to the present invention comprises a light-tight film case having an exposure effecting means, an empty film container previously encased in the light-tight film case, and a rolled film with its one end retained in the empty film container which is previously loaded in the light-tight film case. The light-tight film case is provided with an openable portion which is opened to provide an opening through which the film container is taken out axially. In this lens-fitted photographic film container, the rolled film is taken up in the empty film container one frame every exposure and is fully enclosed in the film container when the exposure of all frames of the film is effected. For taking out the film container, the openable portion of the lens-fitted photographic film package is opened either by the photographer or in a photo shop. The film container taken out is then handled in the same manner as conventional film containers such as film patrones or film cartridges while the lens-fitted photographic film package is scrapped.

According to a feature of a preferred embodiment of the present invention, the openable portion is formed at the bottom of the light-tight film case and is defined by a breakable groove or a breakable perforation. The openable portion is broken from the light-tight film case to form an opening through which the film container with the exposed film enclosed therein is taken out axially. Otherwise, the openable portion is formed by a bottom opening formed in a bottom wall of the light-tight film case and a breakable or openable light-shielding member fixedly attached to the bottom wall to close the bottom opening. The breakable light-shielding member is broken to expose the bottom opening, allowing the film container with the exposed film enclosed therein to be taken out axially.

According to another feature of the preferred embodiment of the present invention, the light-tight film case comprises at least two case sections which are assembled with the rolled film and the empty film container enclosed therein. The two case sections are fixedly attached to each other in any well known manner, for example by means of ultrasonic welding, so as not to be separable. This inseparable light-tight film case forces users to avoid any reuse of the lens-fitted photographic film package after the removal of the film. Thus it is made possible to provide the lens-fitted photographic film package at a low cost.

BRIEF DESCRIPTION OF THE DRAWINGS

The above and other objects and features of the present invention will become apparent from the following detailed description taken in conjunction with the preferred embodiments thereof with reference to the accompanying drawings in which like parts are designated by like numerals throughout the views of the drawings and wherein.

DETAILED DESCRIPTION OF THE INVENTION

The lens-fitted photographic film package according to preferred embodiments of the present invention incorporates several elements, in particular exposure elements and film advancing elements, similar to those of simple still picture cameras. Because such elements are well known to those skilled in the art, this description will be directed in particular to elements forming part of, or cooperating directly with the lens-fitted photographic film package embodying the present invention. It is to be noted that, although the description will be directed to the lens-fitted photographic film package incorporating a 35 mm-size film patrone, the film container may take any of various forms well known to those skilled in the art and already commercially available. It is to be noted that the lens-fitted photographic film package may incorporate a film winding and rewinding mechanism by which a film contained in a film patrone is advanced by one frame every exposure and, when the exposure of all frames of the film is completed, the exposed film is rewound in the film container.

Figure 1:
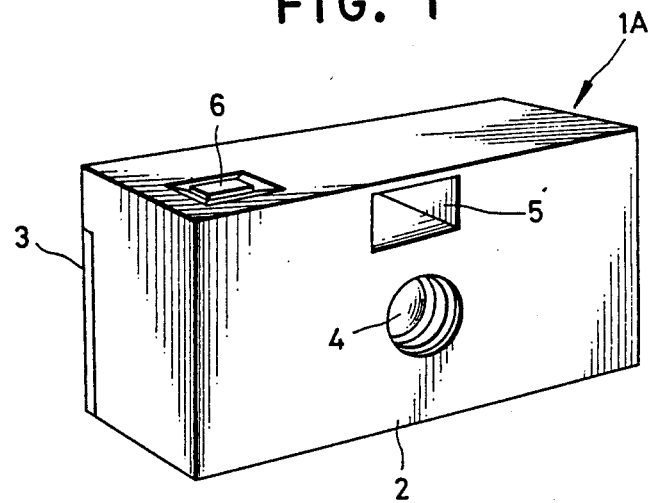
FIG. 1 is a perspective view of the lens-fitted photographic film package of one embodiment of the present invention.

Referring now to FIG. 1, shown therein is a lens-fitted photographic film package (which is hereinafter referred to as a film package for simplicity) 1A of a preferred embodiment of the present invention. The film package 1A comprises a front case section 2 made of plastic materials and a rear case section 3 which are assembled into one body to form a light-tight rectangular box-shaped film case. The front case section 2 is provided with a taking lens 4, a finder window 5, a shutter actuating member 6, and a film advancing knob 8 in its outer walls. Inside the front case section 2, necessary photographic mechanisms such as a shutter mechanism and the like are incorporated. The rear case section 3 is fixed to the front case section 2 in any well known manner, for example by means of ultrasonic welding, so as not to be separable by users. The film package 1A is preferably encased tightly in an outer cover case (not shown in FIG. 1) in which are formed several openings for exposing the taking lens 4, finder window 5, shutter actuating member 6, and the film advancing knob 8.

Figure 2:
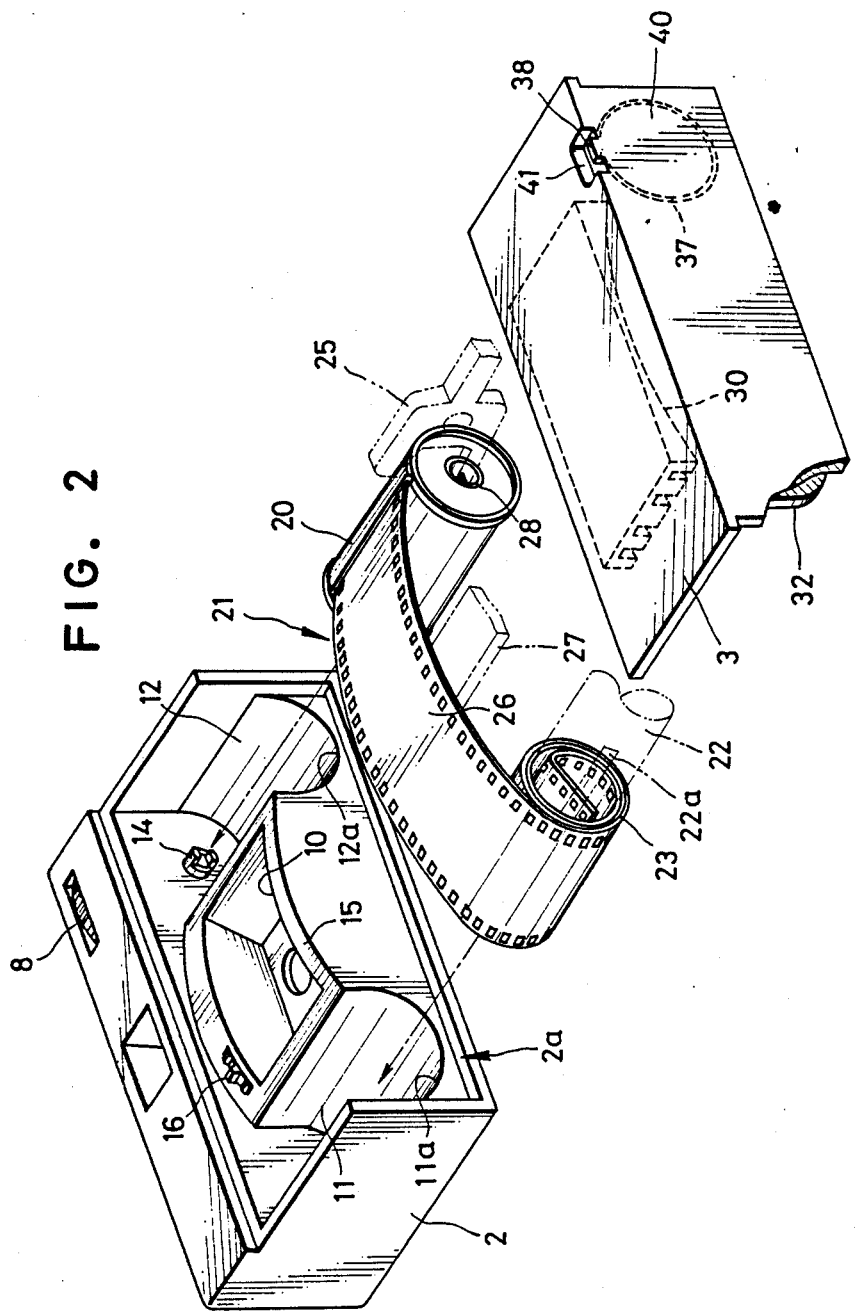
FIG. 2 is an exploded perspective view of the lens-fitted photographic film package of FIG. 1.

FIG. 2 shows the film package 1A disassembled into two sections, namely the front case section 2 having an opening 2a extending across its rear and bottom and the rear case section 3 shaped to complementarily close the opening 2a of the front case section 2. Inside the front case section 2, there are a film roll receiving chamber 11 and a film patrone receiving chamber 12 disposed on opposite sides of an exposure frame 10. As is apparent from FIG. 2, each of chambers 11 and 12 has a semicircular cross section. Projecting from the top wall of the film patrone receiving chamber 12 is a fork 14 which is rotated by the film advancing knob 8 in the clockwise direction as viewed in FIG. 2. The exposure frame 10 is formed with film guiding and supporting tracks 15 on the upper and lower sides thereof. In one of the tracks 154, there is a sprocket wheel 16 partially projecting from the surface of the track 15.

On the outer surface of the bottom wall of the rear case section 3, there is formed a pull-tab 38 and a recess 41 in which the pull-tab 38 is received. On the other hand, in the inner surface of the bottom wall of the rear case section 3, there is formed a circular groove 37 having a V-shaped cross section by which an openable part 40 is defined in the rear case section 3. The circular groove 37 has a diameter larger than that of the patrone 20. The circular groove 37 allows the openable part 40 to be broken or torn off when the pull-tab 38 is pulled so as to form an opening through which the patrone 20 can be axially removed without any necessity of detaching the rear case section 3 from the front case section 2.

Upon assembling the film package 1A, a roll of, for example in this embodiment, 135-size film 21 and the film patrone 20 which is empty but retains one end of the film 21 attached to a spool 28 of the film patrone 20 are put in the chambers 11, 12, respectively, prior to assembling and fixing the two case sections 2 and 3 together. This film 21 is of the type having 35 mm image frames, which is defined as 135 film by ISO-1007: 1979 Edition International Standardization Organization).

The above-described film-loading operation is performed by, in this embodiment, the aid of a film loading jig which is schematically shown by a double dotted line in FIG. 2. In greater detail, the unexposed film 21 withdrawn from the film patrone 20 is wound around a cylindrical spool member 22 of the loading jig as a film roll 23 in many convolutions. The film patrone 20 is held by a gripping arm 25 of the loading jig and a portion 26 of the film extending between the film roll 23 and the film patrone 20 is supported by a plate member 27 of the loading jig in such a way to be slightly raised and curved.

The film patrone 20 and the film 21 held by the loading jig can be inserted into the respective receiving chambers 11 and 12 through respective bottom openings 11a and 12a by moving the loading jig toward the front case section 2 until the top of the spool 28 of the film patrone 20 is brought into engagement with the fork 14. During this film loading operation, since the part 26 of the film 21 is raised and curved, the forward edge of the portion 26 of the film 21 will not be caught by the teeth of the sprocket wheel 16.

After having loaded the film roll 23 and the film patrone 20 in the front case section 2 in the above-described manner, the gripping arm 25 unclamps the patrone 20 and the cylindrical spool member 22 is resiliently deformed to release the film 21. The deformation of the cylindrical spool member 22 is made possible by the provision of a slit 22a by which one end of the film 21 is nipped. Then the loading jig is retracted, leaving the film roll 23 and the film patrone 20 in the respective receiving chambers 11 and 12. Although the rolled film 23 is apt to loosen due to its own curling effect, the outermost convolution of the rolled film 23 is restricted by a wall having a semicircular cross section of the film roll receiving chamber 11 to prevent the film roll 23 from loosening excessively. Then the rear case section 3 is attached and welded to the front case section 2.

Figure 3:
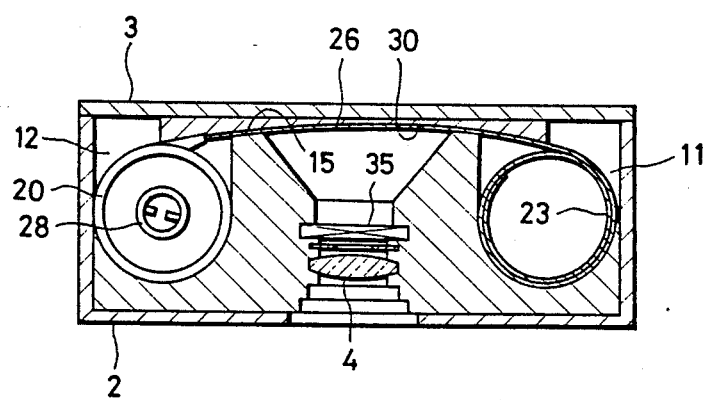
FIG. 3 is a cross-sectional view of the lens-fitted photographic film package of FIG. 1.

As is seen in FIG. 3, inside the rear case section 3 there is a back-up portion 30 shaped complementarily to the shape of the guide tracks 15 of the exposure frame 10 for pressing portion 26 of the film 21 against the tracks 15 so as to place it in the focal plane of the taking lens 4. There is also a raised portion 32 (see FIG. 2) formed on the bottom of the rear case section 3 which closes the opening 11a of the film roll receiving chamber 11 and supports the lower edges of the convolutions of the rolled film 23. From the point of view of cost, it is preferable to use a plastic single lens for the taking lens 4. Although the plastic single lens produces some distortion, the curved tracks 15 help to reduce this distortion. As can be seen in FIG. 3, as the ribs 15 formed on the back portion 30 extend within roll film receiving chamber 11 and support the film in chamber 11 from behind, the roll film 23 avoids substantial deformation from its cylindrical shape and so can be smoothly withdrawn.

The film loading and film package assembling must be done in a darkroom. The film package 1A of this embodiment can be assembled automatically with the aid of a manipulator in cooperation with the above-described loading jig even in a darkroom because of the structural simplicity thereof. Therefore, the film package 1A can be assembled at very low cost.

Alternatively, the film patrone 20 and the film roll 23 may be loaded in such a way as to wind the film 21 around the cylindrical spool member 22 of the loading jig after the loading of the film patrone in the patrone receiving chamber 12. In this case, the film 21 is wound while being raised at an angle between 30° and 45° with respect to the film roll receiving chamber 11. After the film 21 has been fully wound around the cylindrical spool member 22, the rolled film 23 is placed in the film roll receiving chamber 11 and then the cylindrical spool member 22 is removed.

In the use of the film package 1A thus assembled, when the shutter actuating member 6 is operated, a shutter 35 is opened and closed for a time such as to make a proper exposure of a frame of the film 21 in the exposure position. After the exposure, the film advancing knob 8 is operated to rotate the fork 14, thereby directly rotating the spool 28 of the patrone 20 so as to wind the film by one frame, thereby to take up the exposed part of the film in the patrone 20. On the other hand, another frame of the film 21 is forwarded to the exposure frame 10 by rotating the sprocket 16. When the sprocket 16 makes a predetermined number of revolutions, the film advancing knob 8 and the shutter 35 with its associated elements are self-cocked so as to ready the film package 1A for another exposure.

Figure 4:
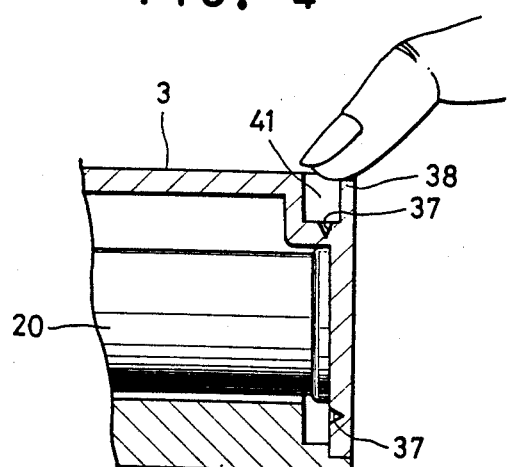
FIG. 4 is a fragmentary cross-sectional view of the lens-fitted photographic film package of FIG. 1.
Figure 5:
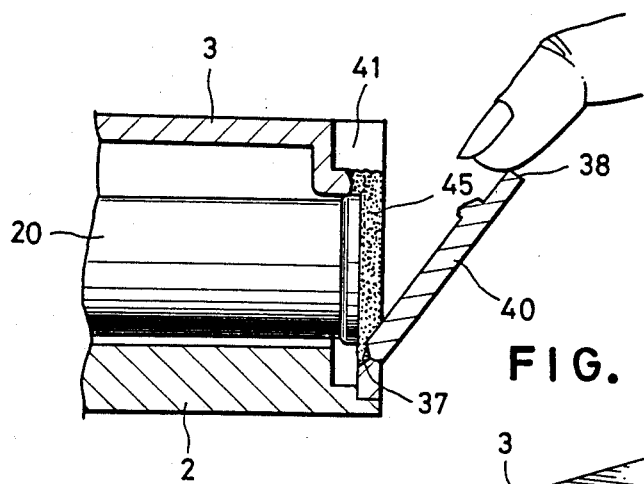
FIG. 5 is a view similar to FIG. 4, of the lens-fitted photographic film package of FIG. 1, wherein a portion of the bottom wall of a rear case section of the film case is broken open.

As the exposure operation is repeated in the manner described above, the film 21 is taken up in the patrone 20 frame by frame. After the exposure of all frames of the film 21, the film 21 is fully wound up in the patrone 20. Then the film package 1A is forwarded to a photo shop without removing the exposed film. There, the patrone 20 is removed from the photographic film package 1A. For this removal of the patrone 20, as is shown in FIGS. 4 and 5, the pull-tab 38 is pulled either by hand or by use of a pulling tool to break or tear off the openable part 40 of the bottom wall of the rear case section 3 along the circular groove 37. As a result, an opening 45 is formed in the bottom wall of the rear case section 3. As previously described, since the opening 45 has a diameter larger than that of the patrone 20, the opening 45 allows the patrone 20 to be easily taken out axially. After the removal of the patrone 20 containing an exposed film, the film package 1A is incapable of being reused because of the opening 45. The patrone 20 is handled in the same manner as conventional patrones to remove the exposed film; then the exposed film is subjected to necessary processing for development and printing.

Figure 6:
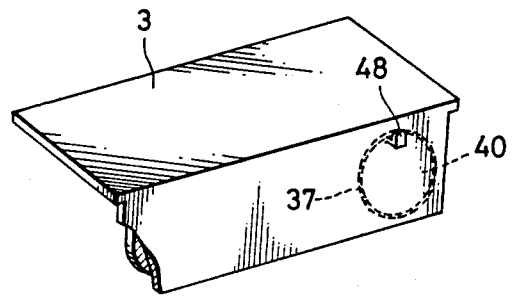
FIG. 6 is a fragmentary perspective view of another embodiment of an entry portion of the lens-fitted photographic film package of the present invention.

FIG. 6 shows a modified film package which has as its only difference from the film package 1A of the preferred embodiment shown in FIG. 2 that an L-shaped pull-tab 48 is provided. The pull-tab 48 is formed integrally with the bottom wall of the rear case section 3 and extends rearwardly.

Figure 8:
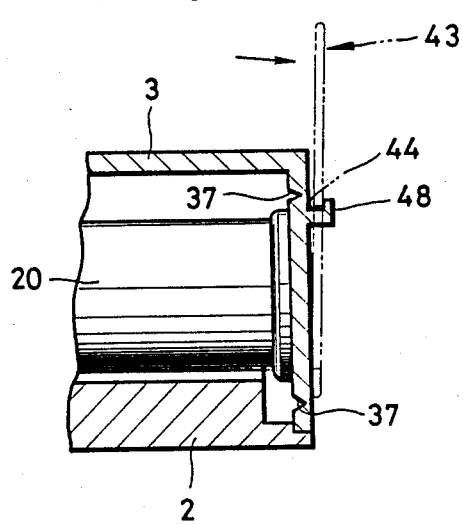
FIG. 8 is a fragmentary cross-sectional view showing the lens-fitted photographic film package of FIG. 6 with the tool of FIG. 7 shown in position prior to its use.
Figure 7:
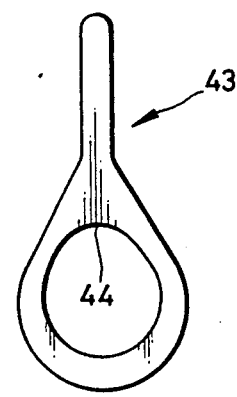
FIG. 7 is a plan view of a tool used for breaking a portion of the bottom wall of a rear case section of the film case of FIG. 6.
Figure 9:
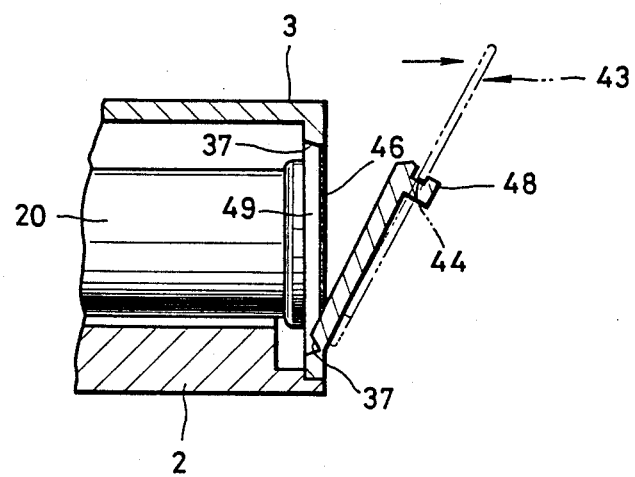
FIG. 9 is a view similar to FIG. 8, of the lens-fitted photographic film package wherein a portion of the bottom wall of a rear case section of the film case has broken open by use of the tool of FIG. 7.

After the exposure of all frames of the film, the film patrone 20 is taken out by a user himself or in a photo shop. In any case, for taking out the patrone 20, a simple opener such as a cap opener 43 or a forked member is preferably used, as is shown in FIGS. 7 to 9. The opener, for example the cap opener 43, is placed with the L-shaped pull-tab 48 in is throat 44 and then is pulled in the direction shown by an arrow in FIGS. 8 and 9. As a result, the openable part 40 is broken and torn off along the V-shaped groove 37 to form a circular opening 49 in the bottom wall of the rear case section 3. Numeral 46 in FIG. 9 denotes the broken sectional surface. As the opening 49 thus formed has a diameter larger than that of the film patrone 20, it is easy to take out the film patrone 20 axially from the film package 1A. This removal of the film patrone 20 from the film package 1A may be performed either by the user or in a photo shop. In any case, the film package 1A with the film patrone 20 removed is scrapped.

If the film package 1A with the film patrone 20 left therein is forwarded to a photo shop, the openable part 40 of the bottom wall of the rear case section 3 may be broken by using a forked patrone opener (which is used to remove a patrone cap from the patrone so as to allow the removal of a film therefrom) well known to those skilled in the art.

The patrone 20 taken out in the above-described manner is handled in the same manner as conventional patrones for processing and printing.

In either embodiment described above, the openable part 40 may instead be located in the back wall of the rear case section.

Reference is now had to FIGS. 10 to 14 showing another preferred embodiment of the film package 1B. The lens-fitted film package 1B comprises a middle case section 50, a front case section 51, and a rear case section 52 which are all made of plastic materials. These sections 50, 51 and 52 are assembled into an integral light-tight box-shaped film case. As will be described in detail later, these sections 50, 51 and 52 are fixedly assembled after having loaded an empty film patrone 20 and a film 21 in the middle case section 50. Therefore, the film patrone 20 and the film 21 cannot be removed by the user.

Figure 11:
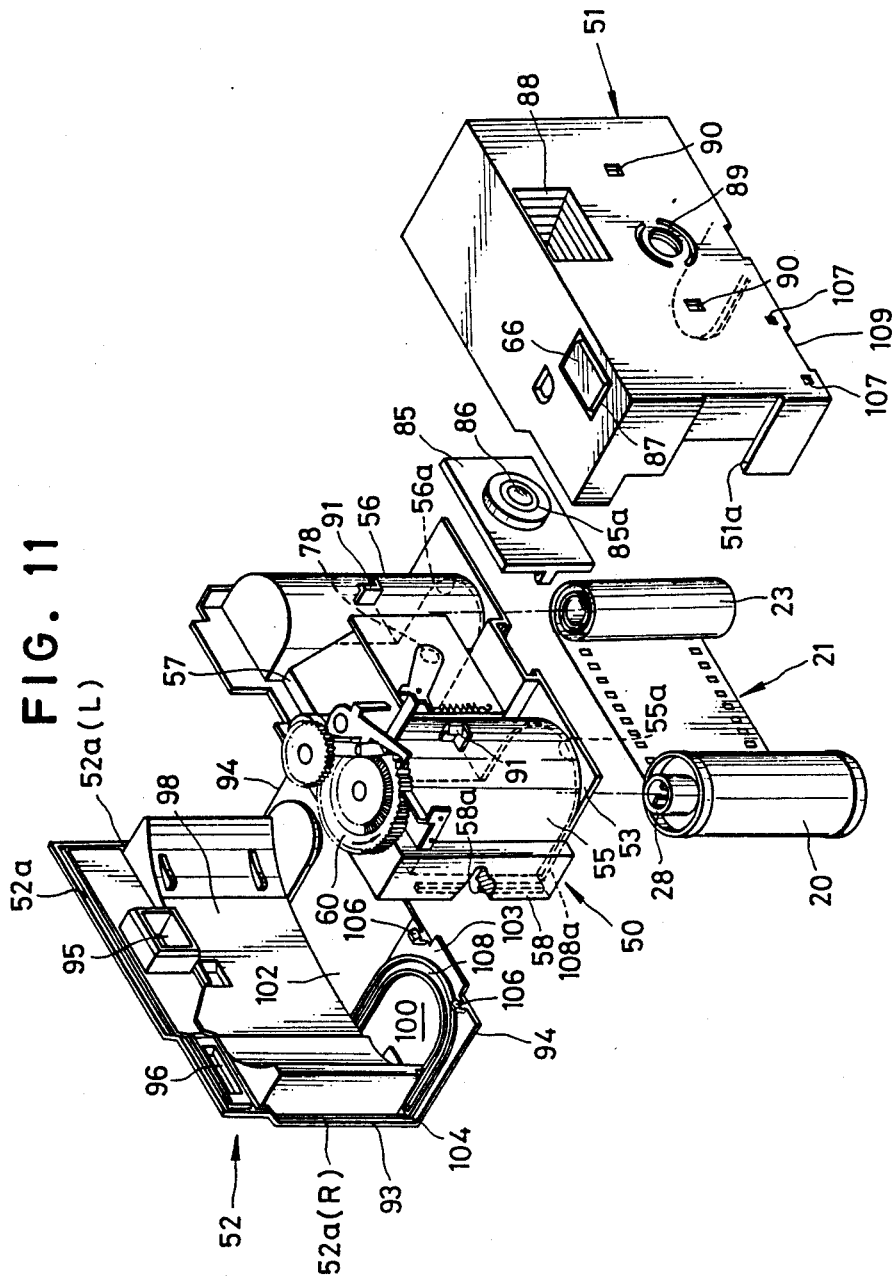
FIG. 11 is an exploded perspective view of the lens-fitted photographic film package of FIG. 10.

As is shown in FIG. 11, on a base plate 53 of the middle case section 50, there are formed a patrone receiving chamber 55 and a film roll receiving chamber 56 spaced apart a predetermined distance from each other. Each chamber 55, 56 is open at its bottom through an opening 55a, 56a through which the patrone 20 or the film 21 is inserted. Upon loading film, the film 21 is withdrawn from the film patrone 20 which is well know to those skilled in the art and already commercially available, and the withdrawn part of the film forms a film roll 23. Then the empty film patrone 20 and the film roll 23 are loaded in the middle case section 50 through the openings 55a and 56a. This loading operation is performed in a darkroom. It is to be noted that the film 21 may be withdrawn from the film patrone 20 after the loading of the film patrone 20 in the middle case section 50.

Between the film patrone receiving and film roll receiving chambers 55 and 56, there is a connecting section 57 in which an exposure frame is formed. All the three sections 55, 56 and 57 are integral with a generally U-shaped frame 58. As is shown in FIG. 11, between the middle case section 50 and the front case section 51, there is a lens supporting board 85 in which an opening 85a is formed to hold a plastic lens 86 as the taking lens. The lens supporting board 85 is so placed as to align the plastic lens 86 with an exposure aperture 78 formed in the exposure frame.

Formed in the top wall of the front case section 51 is a square opening 87 which receives a shutter actuating member 66 with its top surface flush with, or even below, the outer surface of the top wall of the front case section 51. In the front wall of the front case section 51, there are a tunnel-like viewfinder 88, a circular opening 89, and small square openings 90 and 107. The opening 89 is formed coaxially with the optical axis of the lens 86. The small openings 90 are so located as to receive hooked lugs 91 projecting from the middle case section 50 by which the two sections 50 and 51 are temporarily secured together. The other small openings 107 are so located as to receive hooked lugs 106 projecting from a bottom cover section 100 of the bottom wall 94 which will be described later.

The rear case section 52, which has a generally L-shaped configuration, comprises a back wall 93 and a bottom wall 94. In the back wall 93 there is an opening 95 in alignment with the tunnel-like viewfinder 88 through which an object is viewed. There is also formed in the back wall 93 of the rear case section 52 a rectangular opening 96 which receives therein a film advancing knob 60 with its outer periphery flush with, or even below, the outer surface of the back wall 93 of the back cover section 52. Inside the back wall 93 of the rear case section 52 is a raised portion 98 having a curved surface for supporting the film 21 thereon and guiding it therealong.

Figure 12:
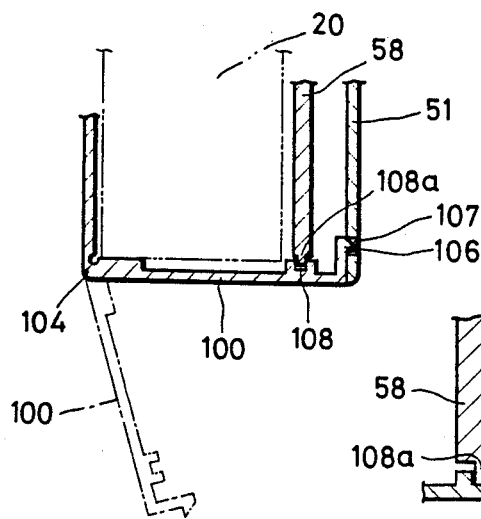
FIG. 12 is a fragmentary cross-sectional view showing a film container receiving chamber of the lens-fitted photographic film package of FIG. 10.
Figure 13:
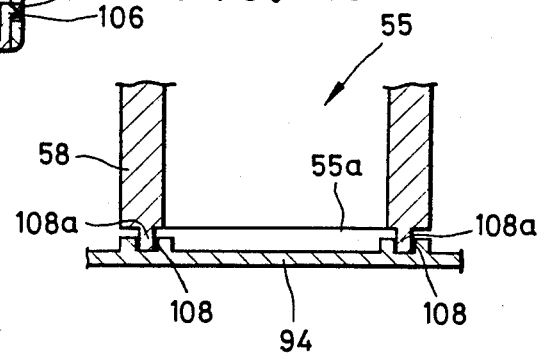
FIG. 13 is a fragmentary cross-sectional view showing the film container receiving chamber similar to but turned 90° from FIG. 12.

The bottom wall 94 of the rear case section 52 is so formed as to cover the bottom openings 55a and 56a of the film patrone receiving chamber 55 and the film roll receiving chamber 56 when the rear case section 52 is fitted to the middle case section 50. The bottom wall 94 is divided into two sections, namely a bottom cover section 100 so formed as to cover the bottom opening 55a of the patrone receiving chamber 55 and a wall section 102. The bottom cover section 100 is attached to the back wall 93 by means of a flexible hinge 104 so as to be capable of opening and closing the bottom opening 55a of the film patrone receiving chamber 55. At a front edge, the bottom cover section 100 is provided with a pair of the hooked lugs 106 upwardly projecting therefrom which are brought into engagement with small square recesses 107 formed in the front wall of the front case section 51 when the photographic film package 1B is assembled, and a jog portion 103 projecting therefrom which is received in a recess 109 formed in the front wall of the front case section 51 when the hooked lugs 106 are engaged in the small holes 107. In the bottom cover section 100 there is also formed a groove 108 which receives a semicircular rail 108a formed on a lower end surrounding the bottom opening 55a of the patrone receiving chamber 55 to form a labyrinth seal when the photographic film package 1B is assembled as is shown in FIGS. 12 and 13. Owing to this labyrinth seal, the inside of the film patrone receiving chamber 55 is maintained light-tight. The rear case section 52 is formed with groove 52a surrounding its outer periphery into which are fitted rails formed on rear surfaces at both sides of the frame member 58 of the middle case section 50 and on rear transverse end surfaces of the front case section 51 to form a labyrinth seal when the photographic film package 1B is assembled. Owing to this labyrinth seal, the inside of the photographic film package 1B can be maintained light-tight. Therefore, the film 21 received in the middle case section 50 can be contained light-tightly when the middle, front and rear case sections 50 to 52 are secured together.

When assembling the film package 1B, the rear case section 52 is first fitted to the middle case section 50 in such a way as to place the bottom cover section 100 and the bottom wall 102 below the base plate 53 of the middle case section 50 so as to cover the openings 55a and 56a of the film patrone and film roll receiving chambers 55 and 56. At this time, the respective vertical grooves 52a(R) and 52a(L) of the rear case section 52 and the semi-circular groove 108 of the bottom cover section 100 receive the corresponding rails 58a and 108a of the middle case section 50. Due to the construction of the film package 1B, by fixing the rear case section 52 to the middle case section 50 in which the film patrone 20 and the film roll 23 have been previously loaded, the film 21 is contained light-tightly. Thereafter, the fixing of the front case section 51 is effected by fitting the rear edge of the front case section 51 into the transverse groove 52a of the rear case section 52 and then by engaging the hooked lugs 91 of the middle case section 50 and the hooked lugs 106 of the bottom cover section 100 with the small square openings 90 and 107 formed in the front wall of the front case section 51, respectively. Thereafter, the rear case section 52 is fixedly attached to the middle case section 52 along the right side vertical groove 52a(R) and the left side vertical groove 52a(L) of the rear case section 52 by ultrasonic welding.

Figure 14:
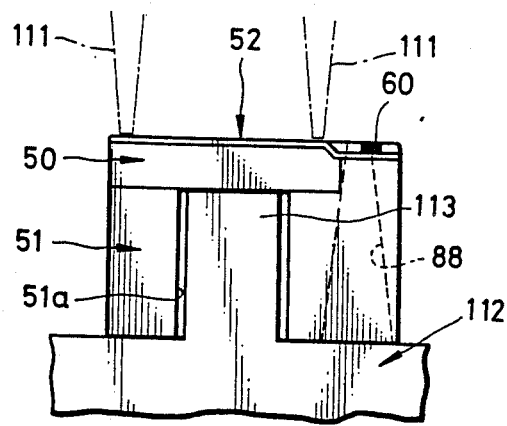
FIG. 14 is a view of the lens-fitted photographic film package of FIG. 10 to which ultrasonic welding is being applied.

This ultrasonic welding may preferably be performed by applying an ultrasonic welding horn 111. For applying the ultrasonic welding, as is shown in FIG. 14, the front case section 51 is supported by a supporting tool 112 having a pair of supporting arms 113. The arms 113 are inserted into recesses 51a formed in both side walls of the front case section 51 of the assembled film package 1B with the rear side up. By pressing on the rear case section 52 with the ultrasonic horn 111, the rear case section 52 is welded to the middle case section 50 along the side vertical grooves 52a(R) and 52a(L). The rear case section 52 is also welded to the front case section 51 at the upper and lower ends of each side vertical groove 52a(R), 52a(L).

Figure 10:
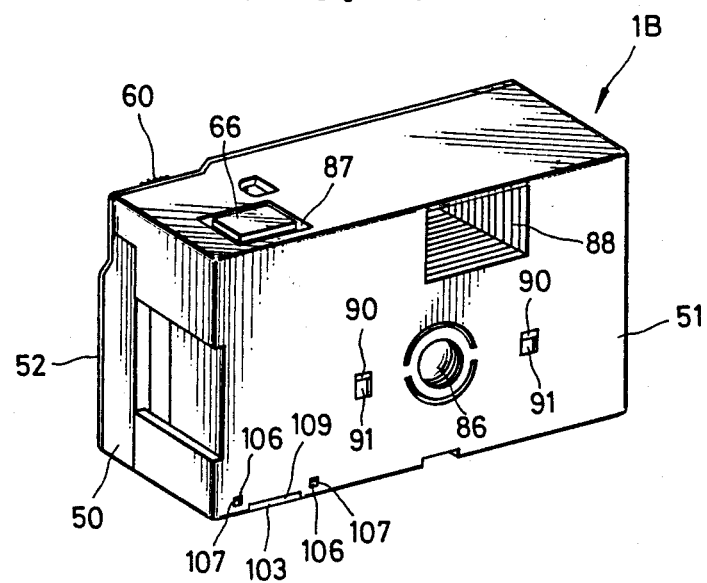
FIG. 10 is a perspective view of a lens-fitted photographic film package according to another preferred embodiment of the present invention.

The film package 1B shown in FIGS. 10 and 11 is used in the same manner as the previously described embodiments. However, in this embodiment, the film patrone 20 can be removed by opening the bottom cover section 100 by disengaging the hooked lugs 106 from the small square holes 107. For disengaging the hooked lugs 106, the tip of the blade of a screwdriver can be inserted between the jog portion 103 and the recess 109 and twisted. Otherwise, it is preferred to push out the hooked lugs 106 by a tool through the small openings 107. Because of the provision of the flexible hinge 104, the bottom cover section 100 can be opened to uncover the bottom opening 55a of the patrone receiving chamber 55. As a result, the film patrone 20 can be easily removed axially.

Figure 15:
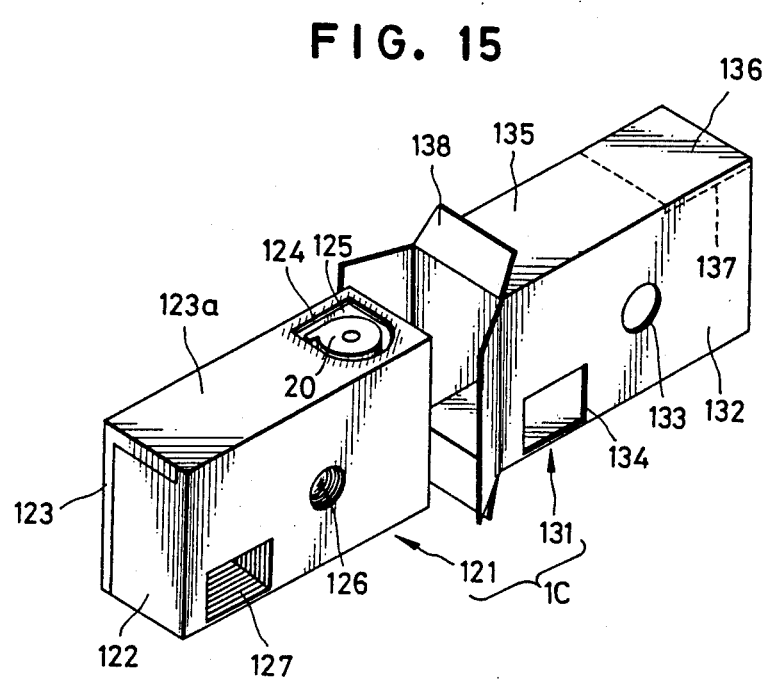
FIG. 15 is an exploded perspective view of the lens-fitted photographic film package of still another embodiment of the present invention wherein the film case is shown outside and to the left of the cover case.

Referring now to FIG. 15, there is shown another preferred embodiment of the present invention wherein the film package 1C comprises a lens-fitted film case 121 similar to the film package 1A or 1B of the previously described embodiments and a cover case 131 in which the lens-fitted film case 121 is encased. The film case 121 comprises front and rear case sections 122 and 123 fixed to each other by, for example, ultrasonic welding so as to form the generally box-shaped film case 121. In the film case 121, a film roll and a film patrone 20 are loaded prior to assembling the front and rear case sections 122 and 123. Formed in the bottom wall 123a of the rear case section 123 is an opening 124 communicating a film patrone receiving chamber 125 with the film patrone 20 received therein. The front case section 122 is provided with an opening 126 with a taking lens held therein and a viewfinder 127.

The cover case 131, which is preferably a printable cardboard or printable plastic material, is formed with a circular opening 133 and a square opening 134 in a front wall 132 thereof which expose the lens holding opening 126 and the viewfinder 127, respectively, when the film case 121 is encased in the cover case 131. In the bottom wall 135 of the cover case 131 there is an openable portion 136 defined by a perforation 137. The openable portion 136 is so located as to overlap the opening 124 of the film case 121 when the film case 121 is encased in the cover case 131. The inner surface of the openable portion 136 of the cover case 131 is covered with a light-shielding material such as a silver foil, blacking or the like. On the other hand, the outer surface of the bottom wall 123a of the rear case section 123 is covered with an adhesive agent having a weak adhesive strength surrounding the opening 124 shown by shading in FIG. 15. The film package 1C of this embodiment is completed by inserting the film case 121 into the cover case 131 tightly and then pressing the openable portion 136 against the bottom wall 123a of the rear case section 123 to close light-tightly the opening 124 formed in the bottom wall 123a. Then flaps 138 are closed and adhesively secured.

After the use of the lens-fitted film package, the openable portion 136 is broken or torn off along the perforated line 137 to expose the opening 124 of the patrone receiving chamber 125. As the openable portion 136 is weakly attached by the adhesive agent, the removable portion 136 can be separated quite easily. Thereupon, the patrone 20 can be removed axially.

Figure 16:
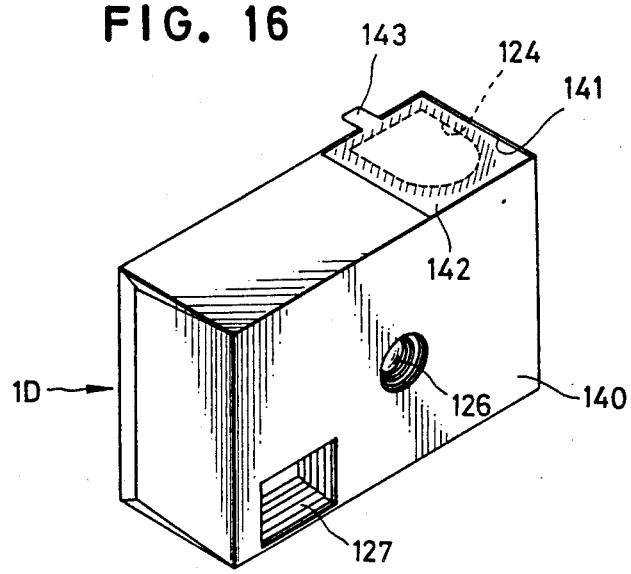
FIG. 16 is a perspective view of the lens-fitted photographic film package of yet another embodiment of the present invention.

Instead of forming the perforated line 137 for defining the openable portion 136 in the bottom wall 135 of the cover case 131, the cover case 131 may be formed with an opening 141 in the bottom wall 135 of the film package 1D as is shown in FIG. 16. Before or after the insertion of the film case 121 into the cover case 131, a light-shielding sheet 142 having a tab 143 is removably attached to the bottom wall 123a of the rear case section of the film case 121 to close light-tightly the opening 124 at the bottom of the film patrone receiving chamber 125 by an adhesive agent shown by shading in FIG. 16. The light-shielding sheet 142 on its inner surface is coated with a light-shielding material such as silver foil, blacking or the like. To remove the patrone 20, the light-shielding sheet 142 can be peeled off by pulling the tab 143 to open the opening 124 formed at the bottom of the patrone receiving chamber 125.

Figure 17:
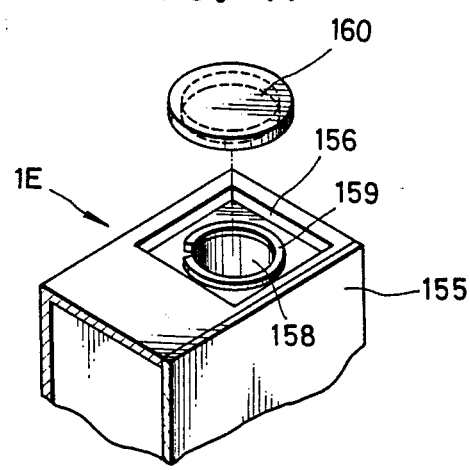
FIG. 17 is an exploded fragmentary perspective view showing the film removal area of the lens-fitted photographic film package of a further embodiment of the present invention.

FIG. 17 shows still another embodiment of the present invention in which the film package 1E is substantially the same in construction as the film package 1A shown in FIGS. 1 to 3 except that there is no provision of the openable portion 40 formed in the bottom wall of the rear case section 3. In a bottom wall 154 of the rear case section 153 fixed to a front case section 155, there is formed a substantially square recess 156 into which a patrone receiving chamber 158 opens. In the recess 156 there is formed an annular projection 159 surrounding the bottom of the patrone receiving chamber 158. An end cap 160 is removably fitted to the annular projection 159 to close and maintain the patrone receiving chamber 158 light-tightly. This end cap 160 is preferably made of a moisture-proof material and is covered with a light-shielding material such as silver foil, blacking or the like on its inner surface. The recess 156 receives therein the end cap 160 with its top surface flush with, or even below, the outer surface of the bottom wall of the film package 1E.

This end cap can be removed easily after the use of this film package so as to open the bottom of the patrone receiving chamber 158, allowing the patrone 20 to be removed axially.

Figure 18:
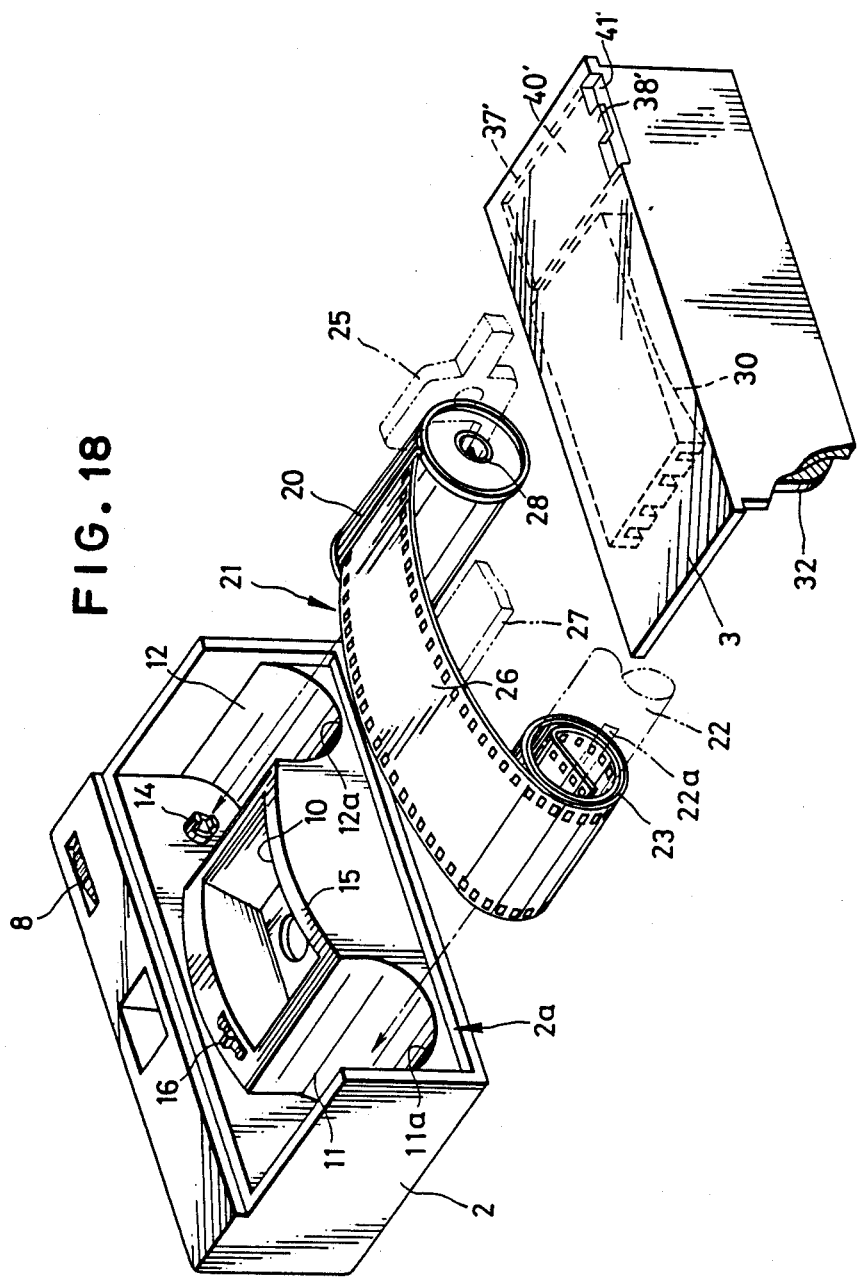
FIG. 18 is a view similar to FIG. 2 but showing a further modification of the invention.

FIG. 18 is a view similar to FIG. 2, but showing a further modification, in which the openable part is no longer on the bottom wall but rather on the rear wall of the rear case section 3. Thus, as shown in FIG. 18, there is provided a line of weakening constituted by a three-sided rectangular groove 37'. A pull tab 38' serves to exert such force on the openable part 40' as to break the rear wall along the groove 37'. A recess 41' is provided below and on either side of the pull tab 38', to facilitate grasping pull tab 38' or the insertion of a tool thereunder.

Although the present invention has been fully described by way of preferred embodiments thereof with reference to the accompanying drawings, it is to be noted that various changes and modifications will be apparent to those skilled in the art. Therefore, unless otherwise such changes and modifications depart from the scope of the present invention as defined by the appended claims, they should be construed as included therein.

What is claimed is:

1. A lens-fitted photographic film package comprising a light-tight film case with a taking lens fitted thereto, a separate empty film cartridge having a spool therein rotatable about an axis of rotation, said film cartridge being enclosed in said light-tight film case on one side of said lens, and an unexposed rolled film with one end retained on said spool in said empty film cartridge, said unexposed rolled film being disposed on the other side of said taking lens with its outermost turn in contact with said film case, said light-tight film case having a portion disposed only on said one side of said lens in alignment with said axis and which is openable only by destroying said film case on a preformed line of weakness bordering said portion, to form an opening for allowing said film cartridge to be removed.

2. A lens-fitted photographic film package as defined in claim 1, wherein said openable portion is defined by a groove along which said openable portion can be broken from said light-tight film case.

3. A lens-fitted photographic film package as defined in claim 1, wherein said openable portion is formed with a tab which can be pulled to break said openable portion from said light-tight case.

4. A lens-fitted photographic film package as defined in claim 3, wherein said light-tight film case has a recess in which said tab is received with its outer surface within the contour of an outer surface of said light-tight film case.

5. A lens-fitted photographic film package as defined in claim 3, wherein said tab is a substantially L-shaped projection.

6. A lens-fitted photographic film package as defined in claim 1, wherein said openable portion comprises an opening formed in a bottom wall of said light-tight film case and a light-shielding member removably attached to said light-tight film case to cover said opening light-tightly.

7. A lens-fitted photographic film package as defined in claim 6, wherein said light-shielding member is a sheet releasably adhered on said bottom wall.

8. A lens-fitted photographic film package as defined in claim 7, wherein said light-shielding member has a tab which can be pulled to remove said light-shielding member.

9. A lens-fitted photographic film package as defined in claim 1, wherein said light-tight film case comprises a front case section with said taking lens attached thereto and a rear case section with said openable portion provided therein, said front case section comprising a film container receiving chamber and a rolled film receiving chamber.

10. A lens-fitted photographic film package as defined in claim 9, wherein said front and rear case sections are fixedly attached to each other by ultrasonic welding.

11. A lens-fitted photographic film package as defined in claim 1, wherein said film container is cylindrical and is removable axially.

12. lens-fitted photographic film package as defined in claim 1, wherein said portion is weakened so as to be openable only by breaking.

13. A lens-fitted photographic film package comprising a light-tight film case with a taking lens fitted thereto, a separate empty film cartridge having a spool therein rotatable about an axis of rotation, said film cartridge being enclosed in said light-tight film case on one side of said lens, an unexposed rolled film with its one end retained on said spool in said light-tight film case, said unexposed rolled film being disposed on the other side of said taking lens with its outermost turn in contact with said film case, and a cover case in which said light-tight film case is enclosed, said light-tight film case having an opening disposed only on said one side of said lens in alignment with said axis and which allows said film cartridge to be removed and is light-tightly closed by said cover, said cover case having a portion overlying said opening and disposed only on said one side of said lens, said portion being openable only by destroying said cover case on a preformed line of weakness bordering said portion.

14. A lens-fitted photographic film package as defined in claim 13, wherein said preformed line of weakness is a line of perforation.

15. A lens-fitted photographic film package as defined in claim 13, wherein said openable portion has an inner surface covered with a light-shielding material.

16. A lens-fitted photographic film package as defined in claim 13, wherein said light-tight film case comprises a front case section and a rear case section which are fixedly attached to each other by ultrasonic welding.

17. A lens-fitted photographic film package comprising a light-tight film case with a taking lens fitted thereto, an unexposed film and a separate film cartridge with one end of said film attached thereto, said film cartridge and most of said unexposed film being disposed on opposite sides of said lens, the unexposed film on the side of said lens opposite said film cartridge being in the form of a roll having its outermost turn in contact with said film case, said light-tight film case being assembled from front to rear case sections inseparably attached to each other to contain said film and said film cartridge in said film package, said film cartridge having a spool therein rotatable about an axis, one of said front and rear case sections having a portion in alignment with said axis and disposed on only the same side of said lens as said film cartridge which is openable only by destroying said film case on a preformed line of weakness bordering said portion, to form an opening in said film package for allowing said film cartridge to be removed while maintaining closed the rest of said film case.

18. A lens-fitted photographic film package as defined in claim 17, wherein said film container is a film patrone defined by ISO-1007 (International Standardization Organization-1007: 1978 Edition).

19. A lens-fitted photographic film package as defined in claim 17, wherein said portion is weakened so as to be openable only by breaking.

20. A lens-fitted photographic film package comprising a light-tight film case with a taking lens fitted thereto; an unexposed rolled film disposed on one side of said taking lens in said light-tight film case with its outermost turn in contact with said case; and a separate film cartridge having therein a film winding spool disposed on the opposite side of said taking lens in said light-tight film case from said unexposed rolled film, one end of said rolled film being fastened to said film winding spool, said light-tight film case being formed with a breakable line only on said opposite side of said lens and in alignment with said axis, along which said light-tight film case is destructible by being partly broken, thereby allowing said film cartridge to be removed in the direction of said axis upon destroying said case along said line.

21. A lens-fitted photographic film package comprising a light-tight film case with a taking lens fitted thereto wherein a roll of unexposed film is enclosed, and a separate film cartridge having a spool therein disposed in said light-tight film case by which said film is wound up in said film cartridge every exposure, said cartridge and said roll of unexposed film being disposed on opposite sides of said lens, said light-tight film case being formed with a breakable line in alignment with the axis of the spool and disposed only on the same side of the lens as said cartridge, along which said light-tight film case is destructible by being partly broken, thereby allowing said film cartridge to be removed in a direction parallel to said axis upon destroying said case along said line.

22. A lens-fitted photographic film package as defined in claim 21, wherein said light-tight film case is a generally box-shaped case.

23. A lens-fitted photographic film package as defined in claim 22, wherein said breakable line is formed in a bottom wall of said light-tight film case.

24. A lens-fitted photographic film package as defined in claim 22, wherein said generally box-shaped case comprises a main case section having an opening extending across its rear and bottom and a plastic rear case section shaped complementarily to close said opening of said main case section.

25. A lens-fitted photographic film package as defined in claim 24, wherein said breakable line is formed in a bottom wall of said plastic rear case section.

26. A lens-fitted photographic film package as defined in claim 24, wherein said rear case section is provided with a member which is pulled to break partly said light-tight film case along said breakable line.

27. A lens-fitted photographic film package as defined in claim 24, wherein said rear case section is fixed to said main case section by ultrasonic welding.

28. A lens-fitted photographic film package comprising a light-tight film case with a taking lens fitted thereto, said case having rearwardly opening chambers on opposite sides of the taking lens, an empty film container disposed in one said chamber, a rolled film disposed in the other said chamber with one end passing behind said taking lens and retained in said empty film container, said case having convex guide surfaces over which the side of the film adjacent the taking lens slides, a back wall portion closing the film case light-tightly and having a plurality of projections integral with said back wall portion and extending in a direction along which a film moves from said rolled film into said film container, said projections having forward edges that are concave as seen in the edgewise direction of the film and that support and guide the film on the side of the film remote from the taking lens, said rolled film chamber having a wall rounded to match the outermost convolution of the rolled film, said projections overlying a portion of said rolled film chamber whereby said rolled film is maintained in a roll by said rounded wall and concave projections, said back wall portion having a readily breakable portion on only the same side of the taking lens as said chamber for said film container, through which said film container can be removed.

29. A lens-fitted photographic film package comprising a light-tight film case with a taking lens fitted thereto, said case having rearwardly opening chambers on opposite sides of the taking lens, an empty film container disposed in one said chamber, a rolled film disposed in the other said chamber with one end passing behind said taking lens and retained in said empty film container, said case having convex guide surfaces over which the side of the film adjacent the taking lens slides, a back wall portion closing the film case light-tightly and having a plurality of projections integral with said back wall portion and extending in a direction along which a film moves from said rolled film into said film container, said projections having forward edges that are concave as seen in the edgewise direction of the film and that support and guide the film on the side of the film remote from the taking lens, said rolled film chamber having a wall rounded to match the outermost convolution of the rolled film, said projections including concave projection portions overlying a portion of said rolled film chamber whereby said rolled film is maintained in a roll by said rounded wall and concave projection portions, said back wall portion having a readily breakable portion on only the same side of the taking lens as said chamber for said film container, through which said film container can be removed.

30. A lens-fitted photographic film package comprising a light-tight film case with a taking lens fitted thereto, a separate empty film cartridge having a spool therein rotatable about an axis of rotation, said film cartridge being enclosed in said light-tight film case on one side of said lens, an unexposed rolled film with its one end retained on said spool in said film cartridge, said unexposed rolled film being disposed on the other side of said taking lens with its outermost turn in contact with said film case, said light-tight film case comprising a front case section, a middle case section which has a film cartridge receiving chamber with an opening at its bottom for removably receiving said film cartridge and a rolled film receiving chamber for receiving said rolled film, and a rear case section having a flexibly hinged member disposed only on said one side of said lens in alignment with said axis and openable to expose said opening of said film cartridge receiving chamber so as to allow said film cartridge to be removed, said flexibly hinged member being formed with grooves into which a projection surrounding said opening of said film container receiving chamber is fitted so as to form a labyrinth seal between said flexibly hinged member and said film container receiving chamber.

31. A lens-fitted photographic film package comprising a light-tight film case with a taking lens fitted thereto, a separate empty film cartridge having a spool therein rotatable about an axis of rotation, said film cartridge being enclosed in said light-tight film case on one side of said lens, an unexposed rolled film with its one end retained on said spool in said film cartridge, said unexposed rolled film being disposed on the other side of said taking lens with its outermost turn in contact with said film case, said light-tight film case comprising a front case section, a middle case section which has a film cartridge receiving chamber with an opening at its bottom for removably receiving said film cartridge and a rolled film receiving chamber for receiving said rolled film, and a rear case section having a flexibly hinged member disposed only on said one side of said lens in alignment with said axis and openable to expose said opening of said film cartridge receiving chamber so as to allow said film cartridge to be removed, said middle case section having hooked lugs by which plural openings in said front case section are engaged so as to secure said middle case section to said front case section.

32. A lens-fitted photographic film package as defined in claim 31, wherein said rear case section is fixed to said middle case section by ultrasonic welding.

33. A lens-fitted photographic film package comprising a light-tight film case with a taking lens fitted thereto, a separate empty film cartridge having a spool therein rotatable about an axis of rotation, said film cartridge being enclosed in said light-tight film case on one side of said lens, an unexposed rolled film with its one end retained on said spool in said film cartridge, said unexposed rolled film being disposed on the other side of said taking lens with its outermost turn in contact with said film case, said light-tight film case comprising a front case section, a middle case section which has a film cartridge receiving chamber with an opening at its bottom for removably receiving said film cartridge and a rolled film receiving chamber for receiving said rolled film, and a rear case section having a flexibly hinged member disposed only on said one side of said lens in alignment with said axis and openable to expose said opening of said film cartridge receiving chamber so as to allow said film cartridge to be removed, said rear case section having a peripheral groove which is engaged partly by vertical projections formed on both sides of said middle case section and partly by a transverse projection formed on an upper rear side of said front case section so as to form a light-tight chamber in said light-tight film case.

* * * * *